May 30, 1939.     R. F. RODA     2,160,407
MANOMETER UNIT FOR A SPHYGMOMANOMETER
Filed Dec. 15, 1937

INVENTOR.
RICHARD F. RODA
BY
D. Clyde Jones
ATTORNEY.

Patented May 30, 1939

2,160,407

UNITED STATES PATENT OFFICE 2,160,407

MANOMETER UNIT FOR A SPHYGMOMANOMETER

Richard F. Roda, Pittsford, N. Y., assignor to Taylor Instrument Companies, Rochester, N. Y., a corporation of New York Application December 15, 1937, Serial No. 179,975

1 Claim. (Cl. 73—31)

This invention relates to a manometer unit of the mercury type for sphygmomanometers.

In the former types of manometer units for sphygmomanometers employing mercury as the indicating medium and having a removable indicating tube, it has been necessary to tilt the open end of the fixture so that the mercury would flow toward the reservoir before removing this indicating tube. If this precaution were not observed, mercury would overflow the upper end of the fixture since it has been desirable to have the zero level of the mercury column visible in the indicating tube. In order to avoid spilling of the mercury when the indicating tube was removed from the fixture, various types of mercury locks have been proposed, but even where such locks were used it was still necessary to tilt the manometer unit so that the mercury would flow into the reservoir before the lock was closed. In the event that this precaution was not observed, the mercury would still overflow even if the instrument was provided with such a mercury lock.

In accordance with the main feature of the present invention, there is provided a manometer unit for a sphygmomanometer in which the zero level of the mercury column is visible in the indicating tube and yet the mercury will not spill out of the fixture when the indicating tube is removed, while the instrument is maintained in its normal or upright position.

Another feature of the invention relates to the specific details of construction of a manometer unit for a sphygmomanometer in which the fixture is provided with a collar having such volume that when the indicating tube is inserted in the normal position therein, the zero level of the mercury column will be visible and yet when the indicating tube is removed from the fixture, the volume of this collar is such that it will contain all the mercury flowing to the fixture as a result of the changed mercury level in the instrument.

Figure 1:
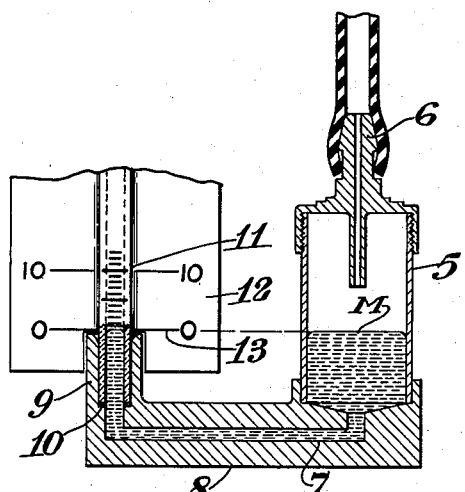
Figure 3:
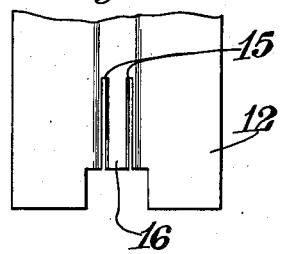
Figure 2:
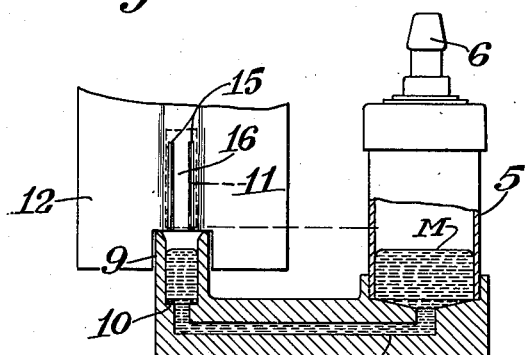
Figure 4:
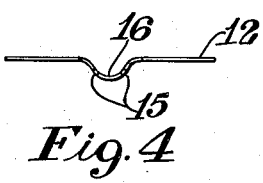
Figure 5:
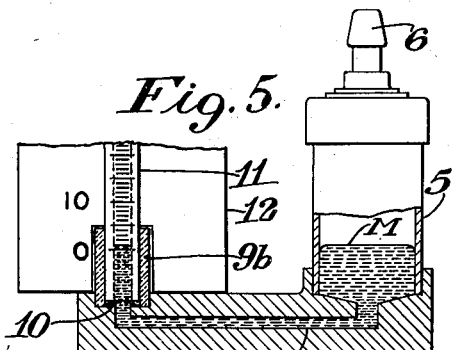

The various features and advantages of the invention will appear from the detailed description and claim when taken with the drawing in which Fig. 1 is a fragmentary view partially in section of the reservoir, fixture and the lower portion of the indicating tube and scale of a manometer unit for a sphygmomanometer with the indicating tube in normal operating position; Fig. 2 is a similar view of the lower portion of the manometer unit for a sphygmomanometer with the indicating tube removed, particularly showing the level of the mercury in the fixture and reservoir under such condition; Fig. 3 is a front elevation of the scale plate showing the construction provided to prevent the lower part of the indicating tube from being inserted rapidly into the collar of the fixture so that mercury will not be splashed therefrom; Fig. 4 is a cross-section of this detail of construction; and Fig. 5 is a vertical section through a fragment of a further modified manometer unit for a sphygmomanometer in which the collar on the fixture is made of a transparent material.

Referring especially to Fig. 1, there is illustrated a portion of a manometer unit for a spyhgmomanometer of the type more fully disclosed in the patent to Bandoly No. 2,051,539. This manometer unit includes a reservoir 5 terminating at its upper end in a nipple 6 to which the well-known cuff and pump (not shown) may be connected. This reservoir contains mercury M and communicates with a passage 7 in a fixture 8 attached at one of its ends to the reservoir. The other end of the fixture 8 is provided with an upright collar 9 preferably integral therewith. Within this collar there is provided a shoulder serving as a seat for a washer or gasket 10 of cork, or the like against which the lower end of a transparent graduated indicating tube 11 is tightly pressed, by means not shown, to afford a mercury-tight joint. At the rear of the indicating tube 11 there is provided a scale plate 12 bearing suitable graduations such as millimetres of mercury. It will be noted that when the indicating tube 11 is mounted as shown, the level of the mercury column therein coincides with the zero graduation 13 on the scale plate.

Although this zero graduation is visible above the upper edge of the collar 9 mercury will not overflow from the collar, as in prior instruments of this type, when the indicating tube 11 is removed from the instrument while it is supported in the position illustrated. In order to obtain this highly desirable result, the volume of the collar 9 is such that when the indicating tube is inserted therein, the mercury level will rise to the zero graduation indicated on the scale plate at 13. However, when the indicating tube 11 is removed, the collar will hold not only the mercury which flows down out of the tube, but also the mercury which flows to the collar from the reservoir 5, due to the lowered or new mercury level in the instrument.

In order to prevent the indicating tube 11 from dropping rapidly into the collar 9 and thereby causing the mercury to splash, the lower end of the scale plate 12 is provided with spaced kerfs 15 which define a spring strip 16 adapted to be sprung toward the collar so that when the tube is dropped down it will engage the edge of the collar. This makes it necessary to compress the spring strip backward before the tube can be inserted into the collar.

In the further modified form of the invention shown in Fig. 5, the collar 9b may be made of transparent material such as glass or suitable synthetic material, such as Bakelite which is joined to the fixture in any suitable liquid-tight manner. The indicating tube 11 preferably makes a snug fit with this collar. In this instance also the volume of the collar 9b should be such that it will prevent the mercury from spilling out of the system when the indicating tube 11 is removed. In this modification the zero graduation for the mercury column need not be above the upper edge of the collar since the zero level of the mercury is visible not only through the glass of the indicating column but also through this transparent collar.

I claim:

In a device of the class described, a reservoir having a connection nipple at its top, a fixture having a passage therethrough communicating with the lower part of said reservoir, a collar connected to said fixture, said collar having therein an upwardly extending cylindrical cavity of substantially uniform internal diameter throughout approximately its entire length, said cavity communicating with said passage, a removable indicating tube having its lower end portion substantially occupying all of said cavity, a resilient washer interposed between the end of said tube and said fixture to afford a mercury-tight joint therebetween, and mercury in said reservoir, said fixture and the lower portion of said tube, the portion of said tube which projects into said collar having such displacement of mercury that the normal level of said mercury is visible through said tube, the volume of said collar being such as to contain the mercury flowing thereto as a result of the new mercury level in the device arising from the removal of the indicating tube from the collar.

RICHARD F. RODA.